United States Patent
Rivers et al.

(10) Patent No.: US 7,327,693 B1
(45) Date of Patent: Feb. 5, 2008

(54) METHOD AND APPARATUS FOR PRECISELY MEASURING A PACKET TRANSMISSION TIME

(75) Inventors: James P. Rivers, Saratoga, CA (US); Pauline Shuen, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 825 days.

(21) Appl. No.: 10/813,826

(22) Filed: Mar. 30, 2004

(51) Int. Cl.
*G01R 31/08* (2006.01)

(52) U.S. Cl. ................ 370/252; 370/412; 370/509

(58) Field of Classification Search ............ None
See application file for complete search history.

(56) References Cited

U.S. PATENT DOCUMENTS

| | | |
|---|---|---|
| 6,608,813 B1 | 8/2003 | Chuissi et al. |
| 2003/0142696 A1* | 7/2003 | Holmeide et al. ......... 370/508 |
| 2004/0223518 A1* | 11/2004 | Repko et al. ............. 370/509 |
| 2004/0246996 A1* | 12/2004 | Engel .................... 370/508 |

OTHER PUBLICATIONS

Montague, Jim, "Ethernet Hits Real-Time . . . Really," Control Engineering, Dec. 1, 2003, copyright 2004 Reed Business Information, a division of Reed Elsevier Inc., retrieved from the Internet: <URL:http://www.manufacturing.net/ctl/Iindex.asp?layout=articlePrint&articleID=CA339683>.

Mohl, Dirk s., "IEEE 1588: Running Real-Time on Ethernet," retrieved from the Internet: <URL:http://ethernet.industrial-networking.com/articles/117real-time.asp>.

* cited by examiner

*Primary Examiner*—Duc Ho
(74) *Attorney, Agent, or Firm*—Charles E. Krueger

(57) ABSTRACT

A method for transmitting a message packet from a network device having multiple transmit queues at a precise time flushes all packets previously enqueued in a selected transmit queue and places the message packet in the selected queue. All other transmit queues are also flushed prior to transmitting the message packet to eliminate timing uncertainty due transmission of enqueued packets prior to the transmission of the message packet.

12 Claims, 2 Drawing Sheets

METHOD AND APPARATUS FOR PRECISELY MEASURING A PACKET TRANSMISSION TIME

BACKGROUND OF THE INVENTION

Factory automation networks have traditionally utilized proprietary protocols specially designed to facilitate real time coordination between master and slaves. For example, in an automotive application, robots may perform simultaneous operations on a work piece and have to be precisely synchronized in time.

Recently, interest in using Ethernet in factory automation has grown due the inclusion of inexpensive Ethernet Network Interface Cards (NICs) on most personal computers and the low costs of components due to commoditization of Ethernet.

Thus, the need for precise synchronization between slaves has challenged network designers utilizing Ethernet in Factory Automation environment. One effort for meeting this challenge is the IEEE 1588 Standard precision Time Protocol (PTP) which defines a method for sub-microsecond synchronization of the clocks in sensors, actuators, and other terminal devices on a standard Ethernet-based network or other distributed application utilizing commercially available technology.

In PTP each terminal device has a precision clock that provides a local time source. Thus, if a master requires two slave devices to perform actions at time tx, it sends a message to each slave device including the time tx. However, each slave device will perform the action at tx referenced to its local clock. If the clocks on the slaves are not synchronized then the operations will not be performed simultaneously.

PTP utilizes two phases to synchronize the clocks. In the first phase the difference between the master clock and slave clock is corrected without taking transmission delay into account. PTP utilizes two messages to implement this step. First a SYNC message is transmitted by the master at a precise time and the slave records the time of receipt of the message with its local clock. The master then transmits a follow up message that contains the exact time of transmission of the SYNC message according to the master clock. The slave utilizes its recorded time of receipt of the SYNC message and the information in the follow up message so adjust the time indicated by its local clock to be the same as the master clock.

However, the delay introduced by the network has not been compensated so that the master and slave clocks still differ by the delay value. To compensate for this delay, in the second phase the slave sends a delay request message to the master and records the time of transmission based on the slave clock. The master then time stamps the received delay request packet at the time of receipt indicated by the master clock and sends the time stamp to the slave in a delay response message. The slave utilizes the recorded time of transmission of the delay request message and the time stamp to adjust its local clock to compensate for transmission delay.

As is apparent from the above, the PTP synchronization can be no more accurate the uncertainty in the times of transmission of the SYNC and delay request messages. However, in switches, routers, and other network infrastructure devices this time of transmission is difficult to precisely measure during heavy load or overload conditions.

In order to synchronize clocks on two different devices using a network protocol, one has to account for all significant time loss in the network protocol. In the case of a 1588 implementation over TCP/IP on Ethernet, there is time loss in a few areas:

1. A first delay is due to the time it takes a packet prepared to be sent by the 1588 PTP to make it through the TCP/IP stack.
2. A second delay is due to the packet having to wait its turn to be transmitted out of the switch because there are queues in switches Accordingly, techniques for implementing PTP on switches, routers, and other network interface structures are the being investigated by engineers working on applying Ethernet to Factory Automation environments.

BRIEF SUMMARY OF THE INVENTION

In one embodiment, a selected transmit queue on a switch is disabled so that all packets are flushed from the selected transmit queue and a timing message is enqueued in the selected transmit queue. All other transmit queues are also disabled to flush all previously enqueued packets from the queues. The selected transmit queue is then enabled and the timing message is transmitted at a precisely recorded time. Since the selected transmit queue and all other transmit queues have been previously flushed there is no delay caused by waiting for previously enqueued packets to be transmitted from the selected transmit queue.

In another embodiment of the invention, a timer on the switch is used to count time and is read to determine the time that the timing message is transmitted.

In another embodiment of the invention, in another embodiment of the invention, an interrupt time on the Other features and advantages of the invention will be apparent in view of the following detailed description and accompanying figures.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1:
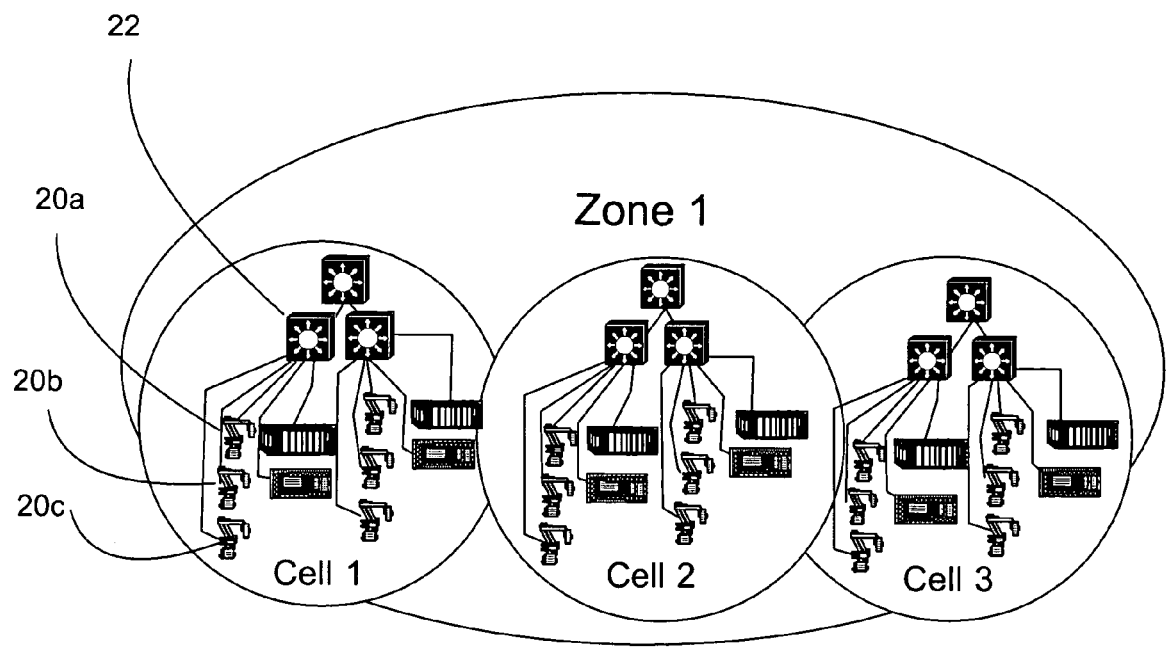
FIG. 1 is a depiction of a factory automation network.

FIG. 1 depicts an example of how a factory automation network might be set up. An assembly line may contain 20-30 robotic welders 20 grouped into work functions. It may be decided that since the control equipment needs to talk to all the welders, all welders and control equipment would be assigned to the same VLAN. However, in some cases where the welders may need to be managed into subgroups (i.e. frame, door panel, hood and trunk), where each of these subgroups is assigned its own VLAN.

In this example, three robotic welders 20a, b, and c are coupled to first switch 22. A master clock on the switch is utilized to synchronize the clocks on each of the three robotic welders so that the welders can operate together to perform complicated operations.

A typical switch configuration including a chassis, which contains basic components such as power supply, fans, slots, ports and modules that slide into the slots. The modules inserted into the slots are line cards which are the actual printed circuit boards that handle packet ingress and egress. Line cards provide one or more interfaces over which traffic flows. Thus, depending on the number of slots and interfaces, a router can be configured to work with a variety of networking protocols. Some, switches are fixed configuration switches that do not use line cards to implement interfaces.

Figure 2:
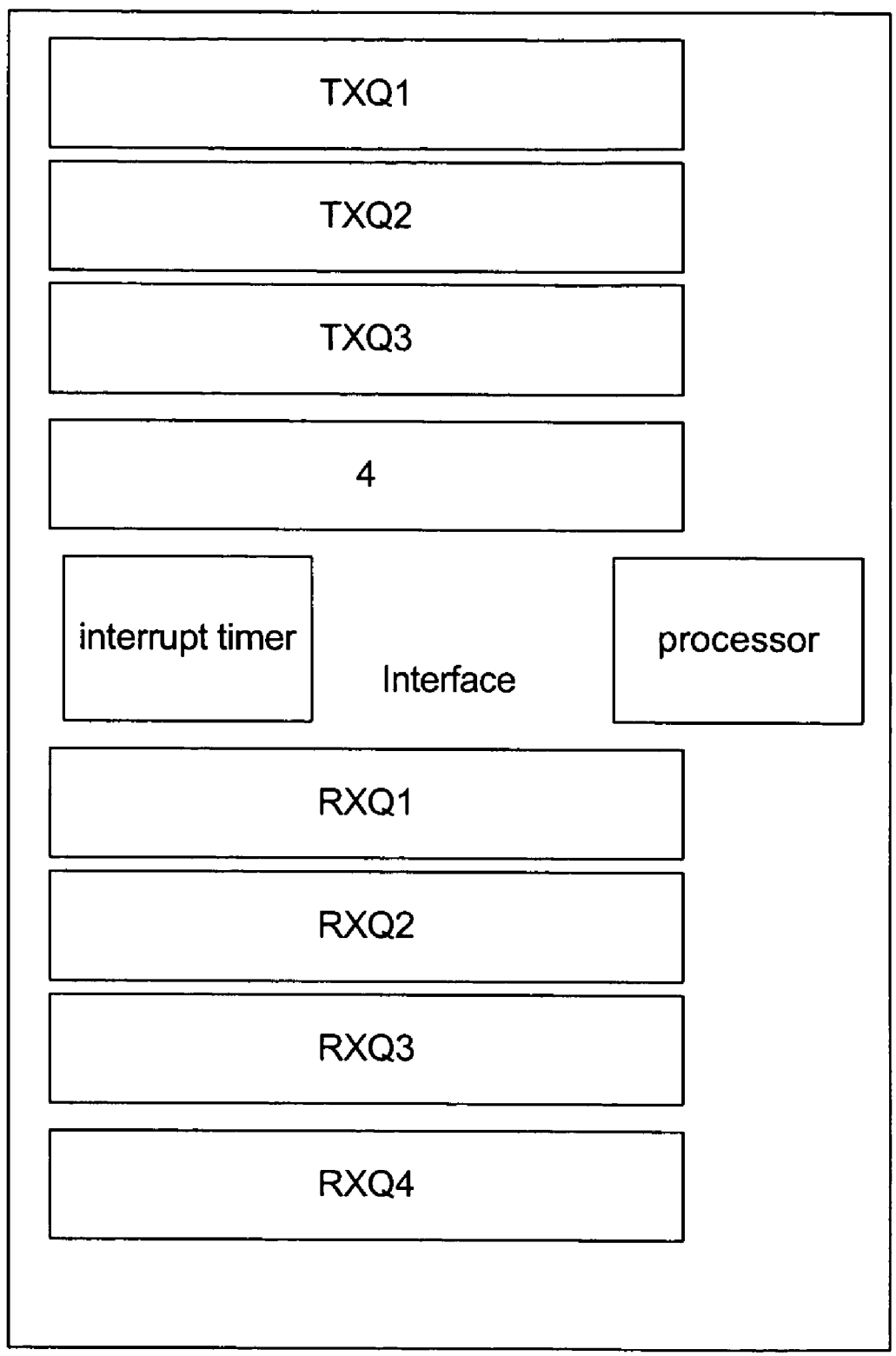
FIG. 2 is block diagram depicting an interface in a switch.

As depicted in FIG. 2, each interface includes transmit and receive memories which are organized logically into transmit and receive queues. For example, each interface in this embodiment includes four transmit queues. Enqueued Packets that are transmitted based on some policy, e.g., round robin weighted round robin, that may take into account Quality of Service and other factors. A processor and interrupt timer are also available to the interface.

For example, packets enqueued in transmit queue 1 (SYNC_Q) may be assigned the highest priority and be transmitted first regardless of the number of packets assigned to the other transmit queues. In implementing the above PTP synchronization protocol the Sync_Req packet would be enqueued in such a high priority transmit queue if it existed.

However, if packets are already in SYNC_Q when the Sync_Req packet is enqueued then the transmission of the Sync_Req packet will be delayed by a non-deterministic time interval while preceding packets in SYNC_Q are being transmitted. Also, the transmission of these packets maybe interleaved with the transmission of packets from other transmission queues. Thus, the actual time of transmission of the Sync_Req message by the master can not be accurately measured.

In one embodiment of the invention, the time of the transmission of the Sync_Req packet is determined by first reading the time on the local Master clock and then reading a first timer value (e.g., count value) on an interrupt timer. The time read from the Master clock is utilized as a base time value.

The SYNC_Q is then disabled so that no other packets are enqueued therein and all packets are flushed from the SYNC_Q. Then a Sync_Req packet is enqueued in SYNC_Q and is assured that it will be the first packet transmitted when SYNC_Q is enabled since all the previously enqueued packet in the SYNC_Q have been flushed.

All other transmit queues are then disabled and the SYNC_Q is not enabled until a selected time interval, e.g. 200 microsecond, elapses to allow all transmit queues to transmit previously enqueued packets. A second timer value is read and the SYNC_Q is enabled to transmit the Sync_Req packet. The time of transmission of the Sync_Req packet is determined by calculating the difference between the first and second timer values and adding the difference to the base time value. The time of the Sync_Req packet transmission is then transmitted to the slave in a follow up message.

Since all transmit queues are flushed prior to transmitting the Sync_Req packet, the non-deterministic time interval has been eliminated and the time of transmission can be more accurately measure.

The following is an example of psuedo-code for performing the above-described embodiment of a switch designed and manufactured by the assignee of the present application:

1588 Algorithm Master Clock:
 Disable SYNC_Q
 Read NTP_TIME (GROSS TIME)
 Read timer interrupt time (FINE TIME)
 Make Sync_Req packet
 Enqueue Sync_Req packet to SYNC_Q
 Disable all non SYNC queues
 Wait ~200 usec so that all packets are drained out of all queues
 Do the following in interrupt context:
 Read timer interrupt time
 Enable SYNC_Q
 Enable all queues Only two instructions, Read timer interrupt time and Enable SYNC_Q, are performed in the interrupt context between the time of reading the second timer value and the time of transmission of the Sync_Req packet. The time of executing these instructions is negligible compared to other timing uncertainties. The enable all queues instruction is executed subsequent to transmission of Sync_Req and does not affect the timing uncertainty.

The invention may be implemented as hardware or a combination of hardware and/or program code, stored on a computer readable medium, that is executed by a digital computer. The computer readable medium may include, among other things, magnetic media, optical media, electromagnetic fields encoding digital information, and so on.

The invention has now been described with reference to the preferred embodiments. Alternatives and substitutions will now be apparent to persons of skill in the art. For example, the above described embodiment has been described implemented in a switch it will be apparent to persons having skill in the art that other network devices, such as a router, bridge, switch, layer 2 or layer 3 switch, gateway, etc., can be utilized to implement the invention. Accordingly, it is not intended to limit the invention except as provided by the appended claims.

What is claimed is:

1. A method for determining the time of transmission of a message packet from a network device including a plurality of transmit queues, said method comprising the steps of:

disabling a selected transmit queue to flush all packets from the selected transmit queue;

placing the message packet in the selected transmit queue;

disabling all other transmit queues;

waiting a selected time interval sufficiently long for all other transmit queues to be flushed;

transmitting the message packet from the selected transmit queue; and measuring time of transmission of the message packet from the selected transmit queue.

2. The method of claim 1 where the steps of transmitting and measuring further comprise:

reading and saving a base time of a local clock and a first timer value of a timer residing on the network device;

reading a second timer value of the timer and transmitting the message packet; and calculating the time of transmission from the base time and first and second timer values.

3. The method of claim 1 where the message packet is a SYNC message utilized in the PTP.

4. The method of claim 1 further comprising the step of:
sending a follow up packet including the time of transmission of the message packet.

5. A system for determining the time of transmission of a message packet from a network device including a plurality of transmit queues, said system comprising:
means for disabling a selected transmit queue to flush all packets from the selected transmit queue;
means for placing the message packet in the selected transmit queue;
means for disabling all other transmit queues;
means for waiting a selected time interval sufficiently long for all other transmit queues to be flushed;
means for transmitting the message packet from the selected transmit queue; and
means for measuring time of transmission of the message packet from the selected transmit queue.

6. The system of claim 5 where the means for transmitting and measuring further comprise:
means for reading and saving a base time of a local clock and a first timer value of a timer residing on the network device; and
means for reading a second timer value of the timer and transmitting the message packet: and
means for calculating the time of transmission from the base time and first and second timer values.

7. The system of claim 5 where the message packet is a SYNC message utilized in the PTP.

8. The system of claim 5 further comprising:
means for sending a follow up packet including the time of transmission of the message packet.

9. Software embodied in one or more computer-readable media and when executed operable to:
disable a selected transmit queue to flush all packets from the selected transmit queue;
place the message packet in the selected transmit queue;
disable all other transmit queues;
wait a selected time interval sufficiently long for all other transmit queue to be flushed;
transmit the message packet from the selected transmit queue; and
measure time of transmission of the message packet from the selected transmit queue.

10. The software of claim 9 operable to transmit and measure further comprising software operable to:
read and save a base time of a local clock and a first timer value of a timer residing on the network device;
read a second timer value of the timer and transmit the message packet; and
calculate the time of transmission from the base time and first and second timer values.

11. The software of claim 9 where the message packet is a SYNC message packet utilized in the PTP.

12. The software of claim 9 when executed further operable to:
send a follow up packet including the time of transmission of the message packet.

* * * * *